United States Patent [19]
Marshall

[11] Patent Number: 5,172,002
[45] Date of Patent: Dec. 15, 1992

[54] OPTICAL POSITION SENSOR FOR SCANNING PROBE MICROSCOPES

[75] Inventor: Daniel R. Marshall, Tucson, Ariz.

[73] Assignee: Wyko Corporation, Tucson, Ariz.

[21] Appl. No.: 748,460

[22] Filed: Aug. 22, 1991

[51] Int. Cl.⁵ .......................... G01J 1/20; G01N 23/00
[52] U.S. Cl. .................................. 250/561; 250/201.1; 250/306
[58] Field of Search ...................... 250/201.4, 306, 307, 250/201.3, 561, 216, 201.1, 234–235

[56] References Cited

U.S. PATENT DOCUMENTS

| | | | |
|---|---|---|---|
| 4,449,084 | 5/1984 | Meno | 318/640 |
| 4,625,103 | 11/1986 | Kitamura et al. | 250/201.4 |
| 4,745,270 | 5/1988 | Horikawa et al. | 250/216 |
| 4,841,191 | 6/1989 | Takata et al. | 250/306 |
| 4,894,537 | 1/1990 | Blackford et al. | 250/306 |
| 4,928,019 | 5/1990 | Tomikawa et al. | 250/561 |
| 4,952,857 | 8/1990 | West et al. | 318/561 |
| 4,998,016 | 3/1991 | Nose et al. | 250/306 |
| 5,026,998 | 6/1991 | Hölzl | 250/561 |
| 5,059,793 | 10/1991 | Miyamoto et al. | 250/307 |
| 5,077,473 | 12/1991 | Elings et al. | 250/306 |
| 5,083,022 | 1/1992 | Miyamoto et al. | 250/306 |

FOREIGN PATENT DOCUMENTS 2-2028702-A 1/1990 Japan .
2-203205-A 8/1990 Japan .

OTHER PUBLICATIONS

"Optical Scan-Correction System Applied to Atomic Force Microscopy", by Barrett and Quate, Rev. Sci. Instrum. 62(6), Jun. 1991, American Institute of Physics, pp. 1393–1399.

*Primary Examiner*—David C. Nelms
*Assistant Examiner*—Michael Messinger
*Attorney, Agent, or Firm*—Cahill, Sutton & Thomas

[57] ABSTRACT

A scanning probe microscope includes a probe support carrying a scanning probe, a piezoelectric transducer having a free end connected to a stage on which the sample is supported, probe sensing circuitry connected to sense a signal indicating interaction between the tip of the probe and a point of the sample surface and producing in response thereto a Z control voltage so as to optimize the interaction and produce a Z coordinate representing the height of a presently scanned point of the sample surface. Optical sensing circuitry includes a light source connected in fixed relation to the sample stage, a position sensitive photodetector, and optics focusing lens for focusing a portion of the light onto a position sensitive detector to cause it to produce X and Y position signals. The light source includes a retroreflector attached to the piezoelectric transducer receiving a beam from a stationary laser and focused by a stationary lens onto the position sensitive detector. Feedback servo circuits are responsive to the X and Y position signals to apply X and Y control voltages to the piezoelectric transducer.

13 Claims, 3 Drawing Sheets

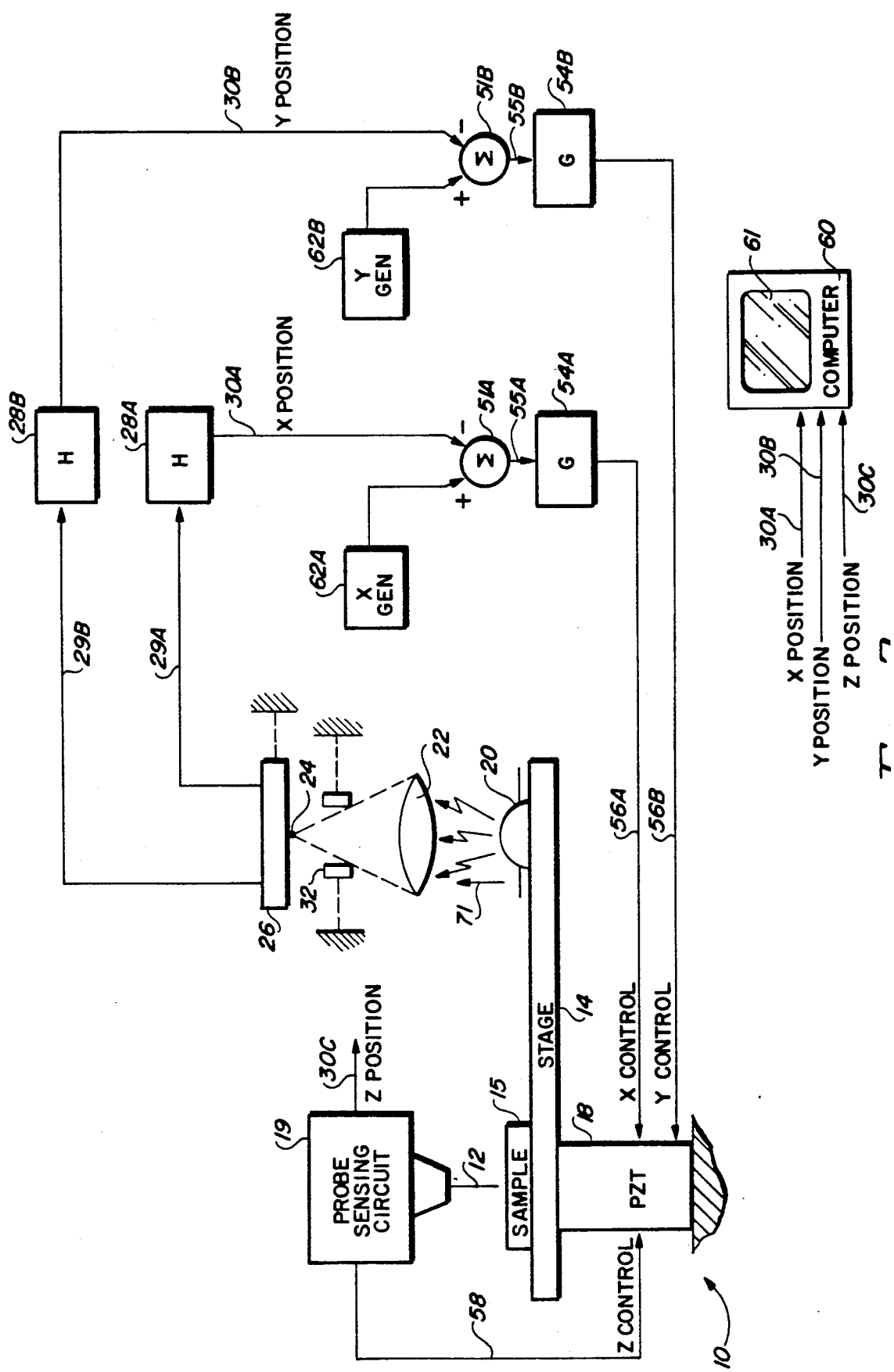

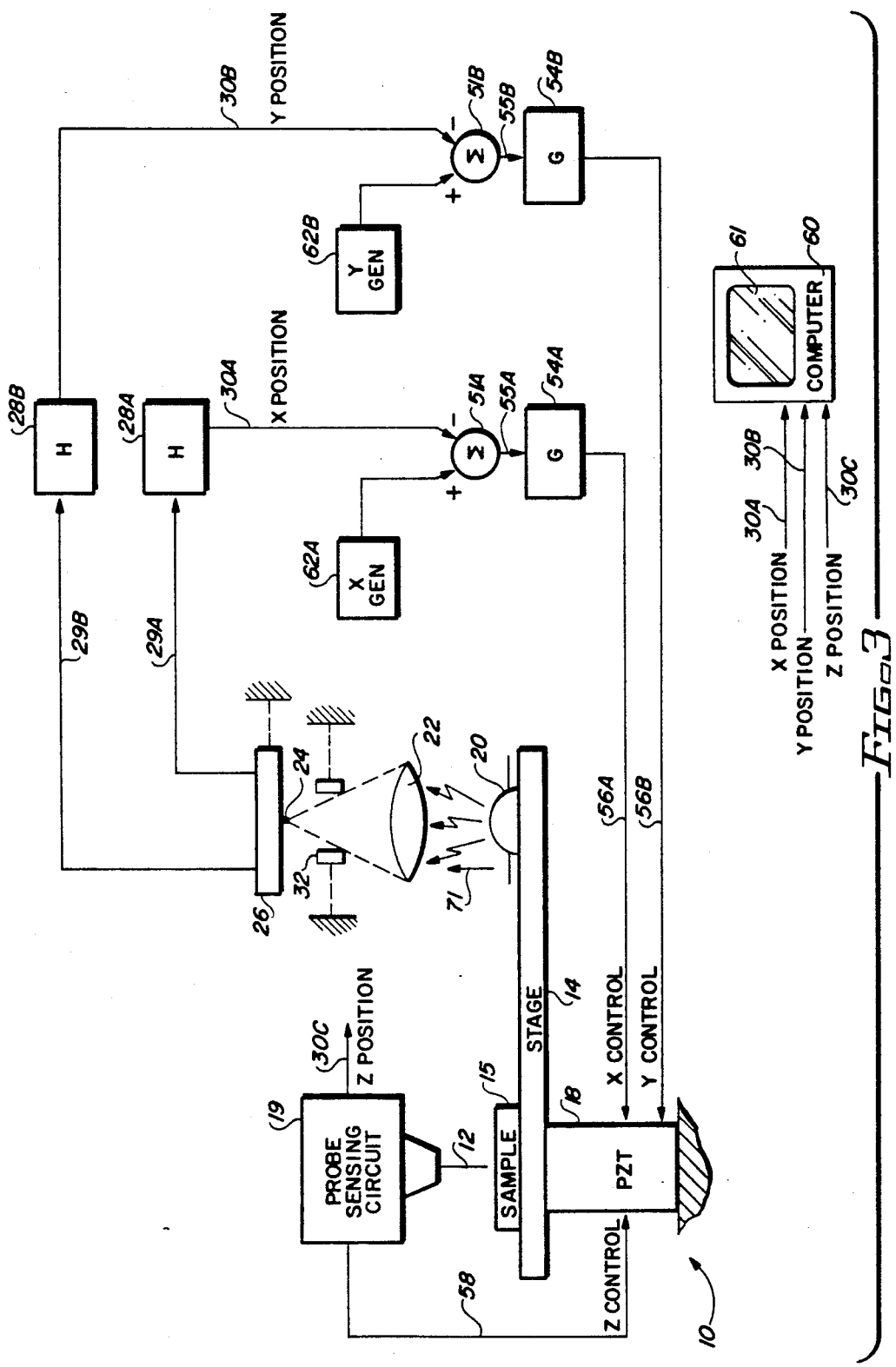

OPTICAL POSITION SENSOR FOR SCANNING PROBE MICROSCOPES

FIELD OF THE INVENTION

The present invention relates to the field of scanning microscopy, and in particular to accurate control and measurement of the position of a moving sample or moving probe.

BACKGROUND OF THE INVENTION

A scanning probe microscope analyzes a succession of small areas which make up the test sample, in contrast to a conventional optical microscope, which forms an image of the sample simultaneously over the entire field of view of the sample. In a scanning probe microscope, the information pertaining to each small area is stored and processed, and recombined into a composite image, much as a television reconstructs an image using a "flying" spot on a picture tube. Scanning probe microscopes figure prominently in a number of areas of research and technology where interactions and features of very small size are important. FIG. 1 shows a schematic diagram of a scanning probe microscope 10 which includes a probe 12 for analyzing a sample 15. The measured data is processed and recombined into a composite image on screen 16.

An important type of scanning probe microscope uses a high precision mechanical actuator to scan the active region of the microscope over the sample, or conversely, to scan the sample past the active region. The microscope's active region may, for example, be defined by a focused beam of light or other energy, or it may be defined by a very local interaction between a probe tip and the sample. Two examples of the latter type of microscope are the Scanning Tunneling Microscope (STM) and the Atomic Force Microscope (AFM). Using short range interactions between the probe and the sample, and by carefully controlling the relative motion between the probe and the sample, it is possible to extend well beyond the resolution limits of conventional optical microscopes, down even to atomic dimensions.

FIG. 2 is a schematic drawing of a typical scanning probe (e.g. STM or AFM) microscope actuator and probe tip. To achieve the highest possible sensitivity and resolution while achieving the least possible distortion of the geometrical features of the object, the scanning motion of the sample or probe must be very well controlled.

Piezoelectric Transducers ("PZTs") of a variety of compositions and geometries have been used for precise motion control. Such transducers are capable of controlled motion with resolutions of 0.01 nanometer or better, with ranges of motion of several micrometers. However, there are several problems associated with the use of PZTs, including hysteresis, non-linearity (sensitivity which varies with range), changes in sensitivity over time, drift or creep (position which changes over time), and mechanical (spring-mass) resonances of the scanning element at relatively low frequencies. For example, over large scan ranges (e.g., over 10 micrometers), hysteresis and non-linearity may cause severe distortion of the scanned image. Furthermore, spring mass resonances may limit scanning speeds, as such resonances must be allowed to decay before scanning is continued.

Prior techniques employed to overcome such problems have not been entirely successful, especially where it has been desirable to extend the scanning range of the device beyond a few micrometers. Some researchers have corrected scanned images with reference to interferometric or capacitance based distance measuring techniques. However, those techniques tend to be cumbersome, sensitive to alignment, and expensive. For example, see "A Scanning Tunneling Microscope with a Capacitance-based Position Monitor", by Griffith et al., Journal of Vacuum Science Technology, pages 2023-2027, Nov./Dec. 1990. This reference describes removal of inaccuracies in probe position measurements. The described device is very sensitive to tilt produced by the PZT. Use of capacitive sensors to achieve two-dimensional sensing as described therein is cumbersome because it is difficult to provide all of the necessary mechanical components in a suitably small volume. Furthermore, capacitive position sensors, because they sense very small changes in the ambient electrical field, are vulnerable to electromagnetic interference, which is very undesirable because the capacitive position sensor must operate in a very noisy electrical environment.

As an example, the problem of drift is particularly acute when the sample to be imaged is small and complicated, such as are most biological molecules, for example, proteins, deoxyribonucleic acid ("DNA") or the like. A molecule of DNA on the average is about 3 nanometers wide and about 100 nanometers long. At a typical STM scanning speed of three lines/second, an image of the DNA molecule can be generated in 1-2 minutes. Unfortunately, the PZT drift is commonly in the range of 5-10 nanometers per minute, which severely affects the resolution of the DNA molecule image. The PZT drift can be reduced to about 1 nanometer per minute if a large scan (on the order of 100 nanometers × 100 nanometers) is used. However, that size of scan is too large for biological molecules, which are usually scanned in a field of about 10 nanometers × 10 nanometers. With that size of scan and a PZT drift of 5-10 nanometers per minute, the image of a DNA molecule would be a blur.

Thus, the prior art has suffered from a lack of a suitable position sensor for measuring the position of a scanned element. It is important that such means have the correct combination of range, stability, resolution, physical compactness, low mass, simplicity, high frequency bandwidth, relative insensitivity to tilt and misalignment, low cost, and freedom from creep (i.e., drift), nonlinearity, and hysteresis. Availability of such a position sensing system would greatly improve scanning microscopy by correcting the defects of PZT-like actuators, either through after-the-fact corrections to measured data or through real-time servomechanical control of the moving element.

SUMMARY OF THE INVENTION

Accordingly, it is an object of the invention to provide a scanning probe microscope which is capable of high accuracy with a larger linear range of measurement than has been achieved in the closest prior art.

It is another object of the present invention to provide a scanning probe microscope which is capable of faster scanning with higher levels of accuracy than is possible with the closest prior art.

It is another object of the invention to provide a scanning probe microscope with a position sensor which is simpler and more economical in structure than the position sensors of the closest prior art.

It is another object of the invention to provide the scanning probe microscope which is less sensitive to tilting motion introduced by a piezoelectric transducer than has been achieved in the closest prior art.

Briefly described, and in accordance with one embodiment of the present invention, a scanning probe microscope includes a probe support carrying a scanning probe so that a tip of the scanning probe is very close to or contacts a surface of a sample, a piezoelectric transducer having an anchored end and a free end connected to a stage on which the sample is supported, probe sensing circuitry connected to sense a signal representative of an interaction between the tip of the probe and a point of the surface of the sample closest to the tip and producing in response thereto a Z control voltage that moves the stage so as to optimize the local interaction and produce a Z coordinate representing the height of the point at which the local interaction has been optimized, and optical sensing circuitry including 1) a light source connected in fixed relation to the sample stage and moveable in the same directions as the sample stage, 2) a position sensitive photodetector, and 3) optics for directing a spot portion of the light onto the position sensitive photodetector to cause it to produce a first X position signal and a first Y position signal. First and second feedback circuits are responsive to the first X position signal and the first Y position signal, respectively, producing a second X position signal and a second Y position signal. A first error circuit receives the second X position signal and a requested X signal and produces an X error signal representative of a difference therebetween. A second error circuit receives the second Y position signal and a requested Y signal and produces a Y error signal representative of a difference therebetween. First and second amplifier circuits receive the X error signal and the Y error signal, respectively, and produce an X control voltage and a Y control voltage, respectively, applied to the X and Y control inputs of the piezoelectric transducer. In one described embodiment, the light source includes a stationary laser producing a beam which is focused over a path which includes a retroreflector mounted on the stage and returned to the photosensitive detector. In another embodiment, a beamsplitter directs part of the focused beam onto the retroreflector, which returns that part of the beam back through the beamsplitter and through a lens to produce the spot portion of the light on the position sensitive device. This embodiment can provide adjustment of the magnification and hence the range and resolution of the scanning probe microscope.

BRIEF DESCRIPTION OF THE DRAWINGS

FIG. 1 is a schematic diagram of a scanning microscope.

FIG. 2 is a schematic diagram of a type of scanning probe microscope in which the active region is defined by a very local interaction between a probe tip and the sample, as in a Scanning Tunneling Microscope (STM) or a Atomic Force Microscope (AFM).

FIG. 3 is a schematic diagram of an embodiment of the present invention including a moving light source.

FIG. 4 is a schematic diagram of another embodiment of the present invention including a moving corner cube or retroreflector.

DESCRIPTION OF THE PREFERRED EMBODIMENTS

Figure 6:
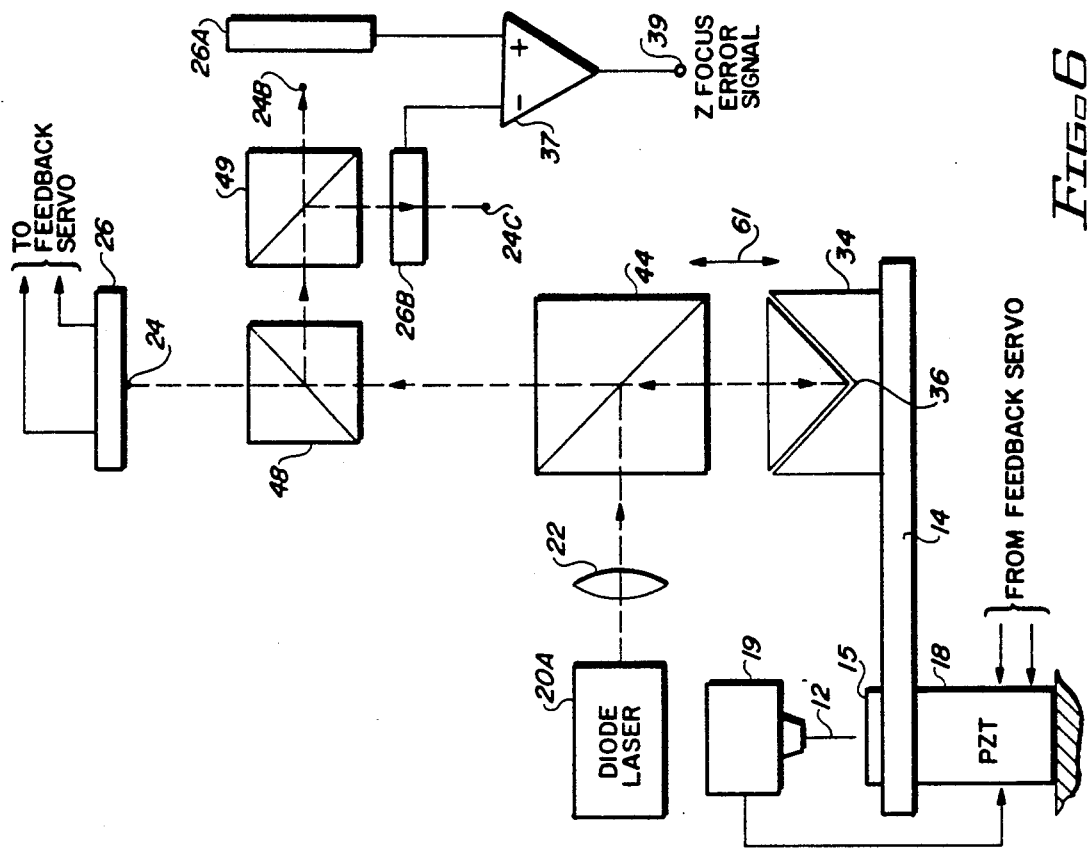
FIG. 6 is a schematic diagram of another embodiment of the present invention including axial motion sensing capability.

The present invention accurately controls and measures the position of a moving sample or a probe of a scanning probe microscope by projecting a spot of light correlated with the moving element onto an optoelectronic detector using optical elements which adjust range, sensitivity and output. Additional electronic circuitry is used for subsequent signal processing and system control. An optoelectronic detector in many ways is an ideal transducer for incorporation into a scanning probe microscope because of its potentially high bandwidth, its non-contact method of measurement, and because of the flexibility with which the operating characteristics may be tailored to particular applications. The optoelectronic detector used in this invention preferably is a lateral effect position sensitive detector (PSD), because of the extended range and linearity achievable thereby. A Model S2044 Lateral Effect PSD available from Hamatsu Photonics K.K., Solid-State Division, of Hamatsu, Japan is suitable. However, other position sensors, such as a segmented detector, also could be used successfully.

Referring to the first embodiment of the present invention illustrated in FIG. 3, a PZT 18, the lower end of which is solidly anchored and the upper end of which is free, is used as a high precision scanning mechanical actuator in a scanning probe microscope. PZT 18 receives X, Y, and Z input control voltages on conductors 56A, 56B, and 58, respectively. Sample stage 14 is attached to the free, moveable end of PZT 18 so as to be moveable in the X, Y, and Z coordinate directions in response to the Z input control voltages, to allow profiling of the surface of a sample 15 that is supported by sample stage 14.

The tip of probe 12 is held stationary with respect to X and Y a minute distance above the surface of sample 15 in the case of an STM, or in contact with the surface of sample 15 in the case of an AFM. Probe sensing circuitry 19, which can be readily implemented by those skilled in the art for an STM or an AFM, produces the Z control signal on conductor 58 to adjust the height of the upper surface of sample 15 relative to the position of the tip of probe 12.

The X control voltage is produced on a conductor 56A by an amplifier circuit 54A having a transfer function G. The input of amplifier 54A is connected by conductor 55A to the output of a summing circuit 51A which produces an error signal on conductor 55A proportional to the difference between an X position signal produced on conductor 30A and a "requested X coordinate" signal produced by X generating circuit 62A. Conductor 30A is connected to an X position output of a feedback circuit 28A which receives an X position input signal on conductor 29A from lateral effect position sensitive detector 26 in accordance with the location thereon of image or spot 24. The transfer function of feedback circuit 28A is H.

Similarly, the Y control voltage on conductor 56B is generated by amplifier circuit 54B in response to an error signal produced on conductor 55B by summing circuit 51B in response to the difference between a Y position signal on conductor 30B and a "requested Y coordinate" signal produced by Y generating circuit 62B. Conductor 30B is connected to a Y position output of a feedback circuit 28B in response to a Y position input signal produced on conductor 29B by lateral effect PSD 26 in accordance with the location of image 24 thereon. Feedback circuit 28B also has a transfer function H. Computer 60 can generate commands to cause X generating circuit 62A and Y generating circuit 62B to produce the "requested X coordinate" and "requested Y coordinate" signals.

The PZT 18 imparts motion to the sample 15, which sample motion, without feedback, may depart slightly from its desired motion because of hysteresis, creep, geometric design, etc. of PZT 18. Alternatively, sample 15 can remain stationary while probe 12 is moved by a PZT.

A small light source 20 is attached in fixed relation to the free end of PZT 18, for example, to sample stage 14. A collecting optical element such as a lens 22 receives light from moving light source 20 and projects a moving light image or spot 24 onto a stationary lateral effect position sensitive detector 26.

While any source of light can be used that provides a sufficiently bright spot, a diode laser is particularly attractive, provided that special care is exercised in the choice and design of the laser source assembly so that the apparent motion of the light source 20A has positional stability at least as good as that of the required measurement. A laser diode has a resonant optical cavity, and as used in the present invention, feedback of light from the measuring system in the form of reflections etc. can destabilize the laser diode to the extent that it is insufficiently stable for high resolution measurements. Therefore the type of laser must be selected carefully, system reflections must be avoided, and the optical elements that collect light from the laser diode must be designed to enhance laser stability.

As sample stage 14 moves, lens 22 projects light spot 24 onto stationary detector 26, and light spot 24 accurately recreates and tracks the motion of sample 15 produced by PZT 18. Electrical circuitry 28A and 28B attached to detector 26 creates corresponding X and Y position signals 30A and 30B which can be used to correct for nonideal movement of sample 15 by PZT 18 by moving sample 15 toward "requested X coordinate" and the "requested Y coordinate" positions until the error signals on conductors 55A and 55B are essentially zero.

Other functionally equivalent arrangements of elements are possible. For example, the positions of light source 20 and detector 26 can be interchanged. Also, light source 20 and detector 26 can remain stationary while a screening aperture or lens connected to the free end of PZT 18 moves. The advantage of the last approach is that the parts of the invention requiring electrical connections may be made stationary.

Because the moving element, which may be either probe 12 or sample 15, may depart from ideal or desired motion, the light collecting optical system should be desensitized to motion of the light source perpendicular to the sample plane. For this reason, it is preferred to position a stationary light limiting aperture 32 so as to impart telecentricity to the system, to assure that the centroid of light spot 24 projected onto detector 26 will not move laterally in response to axial motion (i.e., in the direction of arrows 71) of light source 20, even though the apparent size of the light spot may change slightly. When the optoelectronic detector 26 is a lateral effect position sensitive detector, such telecentricity will assure that the above perpendicular motion of the light source 20 is not misinterpreted as motion in the plane of sample 15.

Lens 22, the optical collecting element in this embodiment, thus forms image 24 of light source 20. This image moves through space in a manner which accurately represents the movement of light source 20. The two dimensional position sensor 26 captures the two-dimensional motion of light source 20 in the plane of sample 15, and is desensitized to motion of light source 20 perpendicular to the plane of sample 15. The collecting optical system may be chosen with appropriate magnification to select a range and sensitivity suitable to the scanning probe microscope.

A second embodiment of the present invention is shown in FIG. 4. In this embodiment, retroreflector or corner cube 34 is attached to PZT 18, in this case by mounting it on stage 14, and reflects the path of all incoming rays about its vertex 36 so that image 24 of stationary lens light source 20A appears to translate in the same directions as vertex 36 moved by PZT 18, but with a 2X magnification. Stationary lens 22 collects uncollimated light from laser 20A and directs it into moving retroreflector 34 which projects a moving light spot 24 onto stationary position sensing detector 26, which generates signals 29A and 29B as previously described with reference to FIG. 3. Note that the light traveling between lens 22 and position sensor 26 is not collimated.

Because of the direction preserving properties inherent in corner cube 34, there is negligible error introduced by tilt of the corner cube, for relatively small angles. Any small tilt error introduced by the optical thickness of a solid, transparent corner cube may be removed either by using a hollow corner cube or by applying a calibrated correcting factor to a given assembly of actuator and corner cube. Changing the magnification of lens 22 does not change the sensitivity of position measurement. (It should be noted that this is an unconventional way of using a corner cube in converging light. Corner cubes are mostly used in collimated, rather than uncollimated, light to return an image in a way which is unaffected by small rotations of the corner cube. I.e., the corner cube is usually used as a tilt-insensitive mirror for collimated light.)

In converging light, the corner cube as used herein becomes a "probe" for motion of the structure (PZT 18) to which the corner cube is connected. Furthermore, the corner cube as used herein is a motion-sensing "probe" which has ideal properties for a position sensor for a PZT, namely, tilt insensitivity, good stability over time and geometric stability in presence of shock, vibration, etc., precise response to rapid motion, excellent linearity, freedom from hysteresis, low mass, physical compactness, relatively low cost, and very high resolution.

Figure 5:
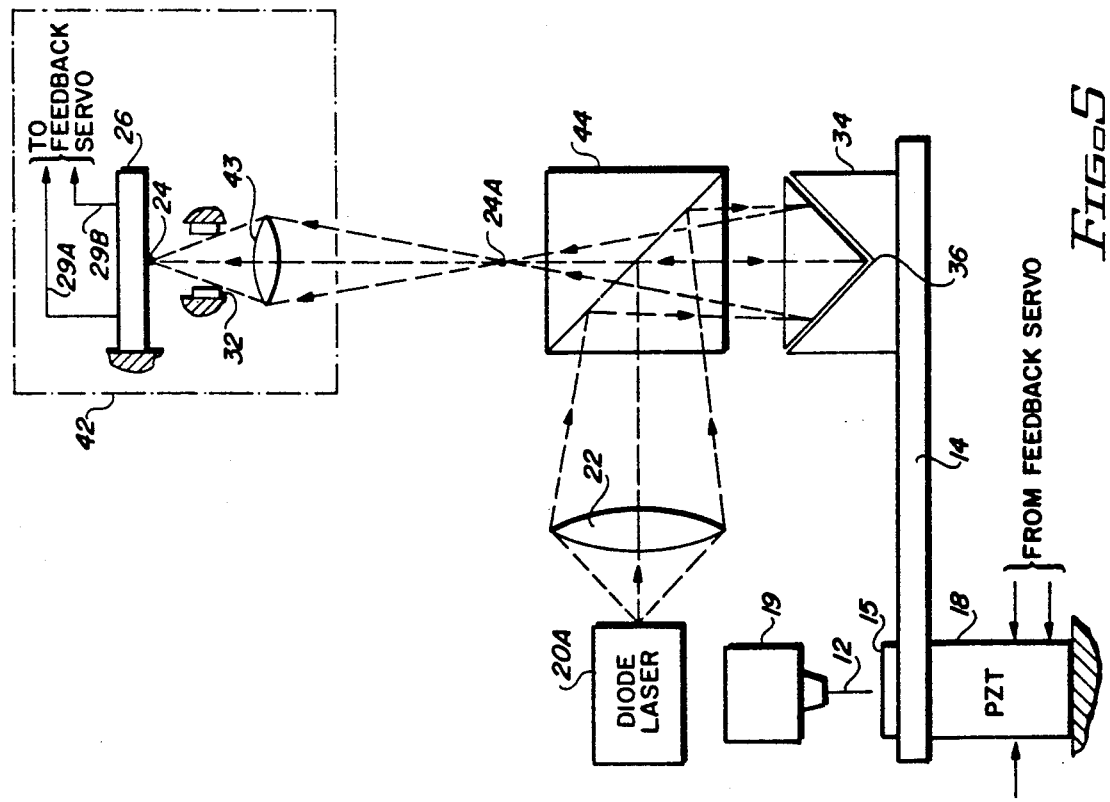
FIG. 5 is a schematic diagram of another embodiment of the present invention.

Since laser 20A in FIGS. 4-6 is stationary, and the corner cube 34, which is low in mass, rigid, and highly stable, and requires no electrical connection to any other component, it provides a high degree of "noise immunity" from vibrations, distortion of the movement of sample stage 14, etc. Furthermore, corner cube 34 dissipates no heat, so there is no distortion of its location as a result of thermal variation in the dimensions of sample stage 14.

Laser 20A can be desensitized to spurious reflections by putting an aperture between the laser and the light collecting optics between laser 20A and position sensitive detector 26. Because lens 22 of FIGS. 4–6 focuses the collimated light coming from laser 20A, causing the exiting rays to converge as they approach retroreflector 34, the light returned in the direction of the aperture is very much out of focus, and very little is returned to the laser cavity. The laser operation therefore remains very stable. Tilt insensitivity is inherent with retroreflectors. Corner cubes typically are constructed of the solid glass, and therefore their dimensions are stable over time, and the solid, rigid structure is generally insensitive to shock and vibration. The absence of wires which would be present for a light source mounted as shown in FIG. 1 avoids shock and vibration that could be conducted through such wires.

A third embodiment of the present invention is shown in FIG. 5, wherein an optical relay system 42 includes a second lens 43 and telecentric aperture 32 to transfer an intermediate image 24A of stationary laser 20A to stationary position detector 26. The level of magnification in the optical relay system 42 may be chosen over a wide range of suitable values and sensitivities. This embodiment and the embodiment of FIG. 4 preserve the advantages previously described in the embodiment of FIG. 3, while further enhancing the removability and simplicity of the actuator assembly by eliminating any need for electrical connection between the moving portion and the stationary portion. In the embodiment of FIG. 5, first beamsplitter 44 allows a smaller corner cube 36 to be used than is used in the embodiment of FIG. 4.

A fourth embodiment of the present invention is illustrated in FIG. 6, wherein a second beamsplitter 48, a third beamsplitter 49, and two three-element photodiode arrays 26A and 26B have been introduced into the optical beam to supply light to a subassembly the purpose of which is to measure axial motion of vertex 36 of corner cube 34. Focused spots 24B and 24C are thereby produced. It should be noted that the prior art includes a wide variety of axial motion or focus sensing methods, only some of which can work in the present application. The reason focus sensing is difficult in the present application is that the spot 24B moves in all of the X, Y, and Z coordinate directions. A focus sensing technique that can work is the structure shown in FIG. 6, which provides common mode noise rejection in the generation of a focus error signal that is obtained by taking the difference between the output signals produced by three-element photodiode arrays 26A and 26B. Difference amplifier 37 measures the difference to produce the focus error signal on conductor 39. This technique is described in more detail on page 812 of "Optical Scanning", Gerald Marshall, editor, Marcel Dekker, 1991. The three-element photodiode arrays 26A and 26B are commonly used in optical disk drives for computers, and are available from Hamatsu Photonics K.K., Solid State Division of Hamatsu, Japan. In combination with parallel motion sensors 26 and 26A as described above, this embodiment makes it possible to precisely characterize actuator motion simultaneously in three orthogonal dimensions.

It should be appreciated that full benefit of using corner cube 36 is not achieved unless care is exercised in selection of the position sensing detector and the light source. Lateral effect position sensitive detectors provide large range with excellent resolution and bandwidth.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, a scanning microscope that does not include a physical probe such as probe 12, and instead scans with a beam which acts as a probe, is within the intended scope of the invention.

What is claimed is:

1. A scanning probe microscope, comprising in combination:
   (a) a probe support carrying a microscope probe so that a tip of the microscope probe is proximate to a surface of a sample;
   (b) a piezoelectric transducer having an anchored end and a free end connected to one of the probe support and a stage on which the sample is supported;
   (c) probe sensing circuitry connected to sense a signal representative of an interaction between the tip of the probe and a point of the surface of the sample closest to the tip and producing in response thereto a Z control voltage applied to the piezoelectric tranducer that moves the one of the probe support and the stage so as to optimize the interaction and produce a Z position signal representing a height of the point at which the interaction has been optimized;
   (d) optical sensing circuitry including
      i. first light directing means connected in fixed relation to the one of the probe support and stage for producing a beam of light that moves in accordance with movement of the one of the probe support and the stage,
      ii. a position sensitive photodetecting device,
      iii. second light directing means for directing at least a portion of the beam onto the position sensitive photodetecting device to produce thereon a spot of light that moves in accordance with the movement of the one of the probe support and the stage to cause the position sensitive photodetecting device to produce a first X position signal and a first Y position signal;
   (e) a first feedback circuit receiving the first X position signal and producing in response thereto a second X position signal, and a second feedback circuit receiving the first Y position signal and producing in response thereto a second Y position signal;
   (f) a first error circuit receiving the second X position signal and a selected X signal and producing an X error signal representative of a difference therebetween, and a second error circuit receiving the second Y position signal and a selected Y signal and producing a Y error signal representative of a difference therebetween; and
   (g) a first amplifier circuit receiving the X error signal and producing in response thereto an X control voltage and applying it to an X control input of the piezoelectric transducer, and a second amplifier circuit receiving the Y error signal and producing in response thereto a Y control voltage and applying it to a Y control input of the piezoelectric transducer.

2. The scanning probe microscope of claim 1 wherein the first light directing means includes a retroreflector attached to the one of the probe support and the stage, the retroreflector receiving light from a beam produced by a stationary laser and focused onto the retroreflector by a first lens, and returning the focused light to produce the spot of light on the position sensitive photodetecting device.

3. The scanning probe microscope of claim 2 wherein the position sensitive photodetecting device is a lateral effect position sensitive photodetecting device.

4. The scanning probe microscope of claim 1 wherein the one of the probe support and the stage is the stage.

5. The scanning probe, microscope of claim 3 wherein the second light directing means includes a beamsplitter interposed between the first lens and the retroreflector and directing at least a portion of light focused by the first lens to the retroreflector, focused light returned by the retroreflector passing through the beamsplitter and through a second lens, the second lens magnifying the returned focused light passing through the beamsplitter to produce the spot of light on the position sensitive photodetecting device.

6. The scanning probe microscope of claim 3 wherein the second light directing means includes a first beamsplitter interposed between the first lens and the retroreflector and directing at least a portion of the focused light to the retroreflector, light returned by the retroreflector passing through the first beamsplitter, a first part of that light passing through the first beamsplitter being reflected by a second beamsplitter and passing to a focus sensing device.

7. A scanning microscope, comprising in combination:
   (a) means for interacting with a surface of a sample, and support means for carrying the interacting means;
   (b) a position transducer having an anchored end and a free end connected to one of the support means and a stage on which the sample is supported;
   (c) sensing circuitry connected to sense a signal representative of the interacting and a point of the surface of the sample closest to the interacting means and producing in response thereto a Z control voltage applied to the position transducer that moves the one of the support means and the stage so as to optimize the interacting and produce a Z position signal representing a height of the point at which the interacting has been optimized;
   (d) optical sensing circuitry including
      i. a position sensitive photodetecting device,
      ii. first light directing means connected in fixed relation to the one of the support means and stage for producing a beam of light that moves in accordance with movement of the one of the support means and the stage, wherein the first light directing means includes a retroreflector attached to the one of the support means and the stage, the retroreflector receiving light produced by a stationary laser and focused by a lens along a path which includes the retroreflector, the retroreflector returning light which constitutes the beam,
      iii. second light directing means for directing the beam onto the position sensitive photodetecting device to produce thereon a spot of light that moves in accordance with the movement of the one of the probe support and the stage to cause the position sensitive photodetecting device to produce a first X position signal and a first Y position signal;
   (e) a first feedback circuit receiving the first X position signal and producing in response thereto a second X position signal, and a second feedback circuit receiving the first Y position signal and producing in response thereto a second Y position signal;
   (f) a first error circuit receiving the second X position signal and a selected X signal and producing an X error signal representative of a difference therebetween, and a second error circuit receiving the second Y position signal and a selected Y signal and producing a Y error signal representative of a difference therebetween; and
   (g) a first amplifier circuit receiving the X error signal and producing in response thereto an X control voltage and applying it to the X control input of the position transducer, and a second amplifier circuit receiving the Y error signal and producing in response thereto a Y control voltage and applying it to the Y control input of the position transducer.

8. A scanning probe microscope, comprising in combination:
   (a) a probe support carrying a microscope probe so that a tip of the microscope probe is proximate to a surface of a sample;
   (b) a position transducer having an anchored end and a free end connected to one of the probe and a stage on which the sample is supported;
   (c) probe sensing circuitry connected to sense a signal representative of an interaction between the tip of the probe and a point of the surface of the sample closest to the tip and producing in response thereto a Z control voltage applied to the position transducer that moves the one of the probe support and the stage so as to optimize the interaction and produce a Z position signal representing a height of the point at which the interaction has been optimized;
   (d) optical sensing circuitry including
      i. light directing means connected in fixed relation to the one of the probe and stage for producing a beam of light that moves in accordance with movement of the one of the probe and the stage,
      ii. a position sensitive photodetecting device, and
      iii. means for directing a beam onto the position sensitive photodetecting device to produce thereon a spot of light that moves in accordance with the movement of the one of the probe support and the stage to cause the position sensitive photodetecting device to produce a first X position signal and a first Y position signal.

9. A scanning microscope, comprising in combination:
   (a) means for interacting with a surface of a sample, and support means for carrying the interacting means;
   (b) a position transducer having an anchored end and a free end connected to one of the support means and a stage on which the sample is supported;
   (c) sensing circuitry connected to sense a signal representative of the interacting at a point of the surface of the sample closest to the interacting means and producing in response thereto a Z control voltage applied to the position transducer that moves the one of the support means and the stage so as to optimize the interacting and produce a Z position signal representing a height of the point at which the interacting has been optimized;

(d) optical sensing circuitry including
  i. a position sensitive photodetecting device,
  ii. first light directing means connected in fixed relation to the one of the support means and stage for producing a beam of light that moves in accordance with movement of the one of the support means and the stage, wherein the first light directing means includes a retroreflector attached to the one of the support means and the stage, the retroreflector receiving light produced by a stationary laser and focused by a lens along a path which includes the retroreflector, the retroreflector returning light which constitutes the beam, and
  iii. second light directing means for directing the beam onto the position sensitive photodetecting device to produce thereon a spot of light that moves in accordance with the movement of the one of the probe support and the stage to cause the position sensitive photodetecting device to produce a first X position signal and a first Y position signal.

10. A method of operating a scanning probe microscope including
  (1) a support means carrying an interacting means for interacting with a surface of a sample,
  (2) a position transducer having an anchored end and a free end connected to one of the probe support and a stage on which the sample is supported,
  (3) sensing circuitry connected to sense a signal representative of the interacting probe at a point of the surface closest to the interacting means and producing in response thereto a Z control voltage applied to the position transducer that moves the one of the support means and the stage so as to optimize the interacting and produce a Z position signal representing a height of the point at which the interacting has been optimized, the method comprising the steps of:
  (a) directing light from the one of the support means and stage to produce a spot of light that moves in accordance with movement of the one of the support means and the stage on a position sensitive photodetecting device, to cause it to produce a first X position signal and a first Y position signal;
  (b) applying the first X position signal to a first feedback circuit and operating it to produce a second X position signal, and applying the first Y position signal to a second feedback circuit and operating it to produce a second Y position signal;
  (c) applying the second X position signal and a selected X signal to a first error circuit to produce an X error signal representative of a difference therebetween, and applying the second Y position signal and a selected Y signal to a second error circuit to produce a Y error signal representative of a difference therebetween; and
  (d) applying the X error signal to a first amplifier circuit to produce an X control voltage and applying it to the X control input of the position transducer, and applying the Y error signal to a second amplifier circuit to produce a Y control voltage and applying it to the Y control input of the position transducer.

11. The method of claim 10 wherein step (a) includes focusing light of a beam produced by a stationary laser along a path including a retroreflector by means of a lens, and returning the focused light to produce the spot of light on the position sensitive photodetecting device, the retroreflector being attached to the one of the support means and the stage.

12. A method of operating a scanning probe microscope including
  (1) a support means carrying an interacting means for interacting with a surface of a sample,
  (2) a position transducer having an anchored end and a free end connected to one of the probe support and a stage on which the sample is supported,
  (3) sensing circuitry connected to sense a signal representative of the interacting probe at a point of the surface closest to the interacting means and producing in response thereto a Z control voltage applied to the position transducer that moves the one of the support means and the stage so as to optimize the interacting and produce a Z position signal representing a height of the point at which the interacting has been optimized, the method comprising the steps of:
  (a) focusing light of a beam produced by a stationary laser along a path including a beamsplitter by means of a first lens;
  (b) reflecting the focused beam from the beamsplitter to a retroreflector attached to the one of the support means and the stage; and
  (c) returning the focused beam from the retroreflector along a path including the beamsplitter and a second lens to produce a spot on a position sensitive photodetecting device, to thereby cause the position sensitive photodetecting device to produce an X position signal and a first Y position signal.

13. A method of operating a scanning probe microscope including
  (1) a support means carrying an interacting means for interacting with a surface of a sample,
  (2) a position transducer having an anchored end and a free end connected to one of the probe support and a stage on which the sample is supported,
  (3) sensing circuitry connected to sense a signal representative of the interacting probe at a point of the surface closest to the interacting means and producing in response thereto a Z control voltage applied to the position transducer that moves the one of the support means and the stage so as to optimize the interacting, the method comprising the steps of:
  (a) focusing light of a beam produced by a stationary laser along a path including a first beamsplitter by means of a lens;
  (b) reflecting the focused beam from the beamsplitter to a retroreflector attached to the one of the support means and the stage;
  (c) returning the focused beam from the retroreflector along a path including the first beamsplitter and a second beamsplitter to produce a spot on a first position sensitive photodetecting device, to thereby cause the first position sensitive photodetecting device to produce an X position signal and a Y position signal; and
  (d) simultaneously with step (c), reflecting part of the focused beam returned by the retroreflector onto a second position sensitive photodetecting device to cause the second position sensitive photodetecting device to produce a Z position signal representing a height of the point at which the interacting has been optimized.

* * * * *